(12) United States Patent
Zhang et al.

(10) Patent No.: US 8,416,302 B2
(45) Date of Patent: Apr. 9, 2013

(54) LOW-LIGHT IMAGING AUGMENTED WITH NON-INTRUSIVE LIGHTING

(75) Inventors: Chunhui Zhang, Beijing (CN);
Yasuyuki Matsushita, Bejing (CN);
Yuan Kong, Kirkland, WA (US);
Zicheng Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1064 days.

(21) Appl. No.: 12/368,831

(22) Filed: Feb. 10, 2009

(65) Prior Publication Data
US 2010/0201823 A1 Aug. 12, 2010

(51) Int. Cl.
*H04N 5/33* (2006.01)

(52) U.S. Cl.
USPC .............................................. 348/164; 348/33

(58) Field of Classification Search .... 348/14.01–14.16, 348/32–34, 162–168; 382/155–167, 254, 382/270–275
See application file for complete search history.

(56) References Cited

U.S. PATENT DOCUMENTS

| | | | | |
|---|---|---|---|---|
| 4,016,597 | A * | 4/1977 | Dillon et al. | 348/266 |
| 6,150,930 | A * | 11/2000 | Cooper | 340/435 |
| 6,344,874 | B1 | 2/2002 | Helms et al. | |
| 6,614,013 | B2 | 9/2003 | Pitigoi-Aron et al. | |
| 7,012,643 | B2 * | 3/2006 | Frame | 348/272 |
| 7,277,090 | B2 | 10/2007 | Allen et al. | |
| 7,468,722 | B2 | 12/2008 | Ferguson | |
| 7,609,291 | B2 * | 10/2009 | Oon et al. | 348/164 |
| 7,619,685 | B2 * | 11/2009 | Wernersson | 348/374 |
| 7,620,265 | B1 * | 11/2009 | Wolff et al. | 382/276 |
| 7,945,113 | B2 * | 5/2011 | Hayaishi | 382/274 |
| 8,068,159 | B2 * | 11/2011 | Choe et al. | 348/311 |
| 2003/0016290 | A1 | 1/2003 | Kwon | |
| 2003/0210332 | A1 * | 11/2003 | Frame | 348/216.1 |
| 2005/0040333 | A1 * | 2/2005 | Fleury et al. | 250/332 |
| 2006/0088298 | A1 * | 4/2006 | Frame et al. | 386/117 |
| 2007/0081084 | A1 * | 4/2007 | Wernersson | 348/231.99 |
| 2007/0127908 | A1 * | 6/2007 | Oon et al. | 396/155 |
| 2008/0239091 | A1 * | 10/2008 | Soga | 348/222.1 |
| 2008/0279467 | A1 * | 11/2008 | Liu et al. | 382/254 |
| 2008/0297611 | A1 * | 12/2008 | Qiu et al. | 348/211.3 |
| 2009/0065679 | A1 * | 3/2009 | Tanimoto | 250/208.1 |

FOREIGN PATENT DOCUMENTS

WO WO9401968 1/1994

OTHER PUBLICATIONS

Jie Yang, Weier Lu and Alex Waibel, "Skin-Color Modeling and Adaptation", Lecture Notes in Compute Science, vol. 1352/1997, 1997, pp. 687-694.*

Arvind Nayak and Subhasis Chaudhuri, "Self-Induced Color Correction for Skin Tracking Under Varying Illumination", International Conference on Image Processing Proceedings, vol. 2, 2003, pp. 111-1009.*

Cuizhu Shi, Keman Yu, Jiang Li and Shipeng Li, "Automatic image Quality Improvement for Videoconferencing", IEEE International Conference on Acoustics, Speech and Signal Processing, May 2004, pp. 111-701-111-704.*

(Continued)

*Primary Examiner* — Brendan Higa
(74) *Attorney, Agent, or Firm* — Lee & Hayes, PLLC

(57) ABSTRACT

In some implementations, invisible light is emitted toward a subject being imaged in a low-light environment. A camera having a first color image sensor captures an image of the subject. Image processing is used to correct distortion in the image caused by the invisible light, and an augmented color image is output.

20 Claims, 9 Drawing Sheets

OTHER PUBLICATIONS

"How Night Vision Works", Electrophysics, retrieved from the internet Feb. 9, 2009 at http://www.hownightvisionworks.com/.

"Infrared Vidicon Camera C2741-03", Hamamatsu Photonics K.K., Systems Division, Japan, retrived from the internet Feb. 9, 2009 at http://sales.hamamatsu.com/assets/pdf/hpspdf/C2741-03HPD.pdf.

Walker, "Simple Experiments with Video Image Capture Using a Near Infra-Red Light Source", retrieved from the internet Dec. 9, 2009 at http://www.microscopy-uk.org.uk/mag/indexmag.html?http://www.microscopy-uk.org.uk/mag/artjun98/infrared.html.

* cited by examiner

LOW-LIGHT IMAGING AUGMENTED WITH NON-INTRUSIVE LIGHTING

CROSS REFERENCE TO RELATED APPLICATION

This application is related to co-pending U.S. patent application Ser. No. 11/801,620, to Zicheng Liu et al., filed May 10, 2007, assigned to the same assignee as herein, the entire disclosure of which is incorporated herein by reference.

BACKGROUND

Proper light level is important for producing high-quality images and videos using digital cameras. In low-light environments (also known as photon-limited situations) the amount of light illuminating a subject is inadequate to produce a high-quality color image. For example, in low-light environments, the noise level produced in images increases significantly due to the nature of imaging devices, and the color quality may be poor and not accurately represent the actual colors of the scene. This problem typically arises from either a weak light source illuminating a scene being photographed or from the use of a small or low-quality lens in the device attempting to photograph the scene. In either case, the low-light situation often precludes the capturing and rendering of high-quality images and videos.

There have been many attempts at improving such photon-limited situations, including improvements in sensors and optics, as well as in image processing algorithm development. However, none of these have resulted in a suitable solution for producing high-quality color images in low-lighting situations, such as is encountered during use of a webcam, where it is desirable to provide a low-cost solution that minimizes additional lighting and distraction to the user while still providing a high-quality image on the receiving end.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter nonintrusive.

Some implementations disclosed herein use an active lighting approach to improve image quality in low-light conditions. Implementations herein incorporate non-intrusive light sources and image processing for improving the quality of an image. In some implementations, a video or still camera is equipped with invisible or otherwise non-intrusive light sources, thereby increasing the active lighting on the subject/scene being imaged, and post-imaging processing is then used to make the image appear as a high quality image.

BRIEF DESCRIPTION OF THE DRAWINGS

The accompanying drawing figures, in conjunction with the general description given above, and the detailed description given below, serve to illustrate and explain the principles of the best mode presently contemplated. In the figures, the left-most digit of a reference number identifies the figure in which the reference number first appears. Further, like numerals describe substantially similar features and components throughout the several views.

DETAILED DESCRIPTION

Figure 1:
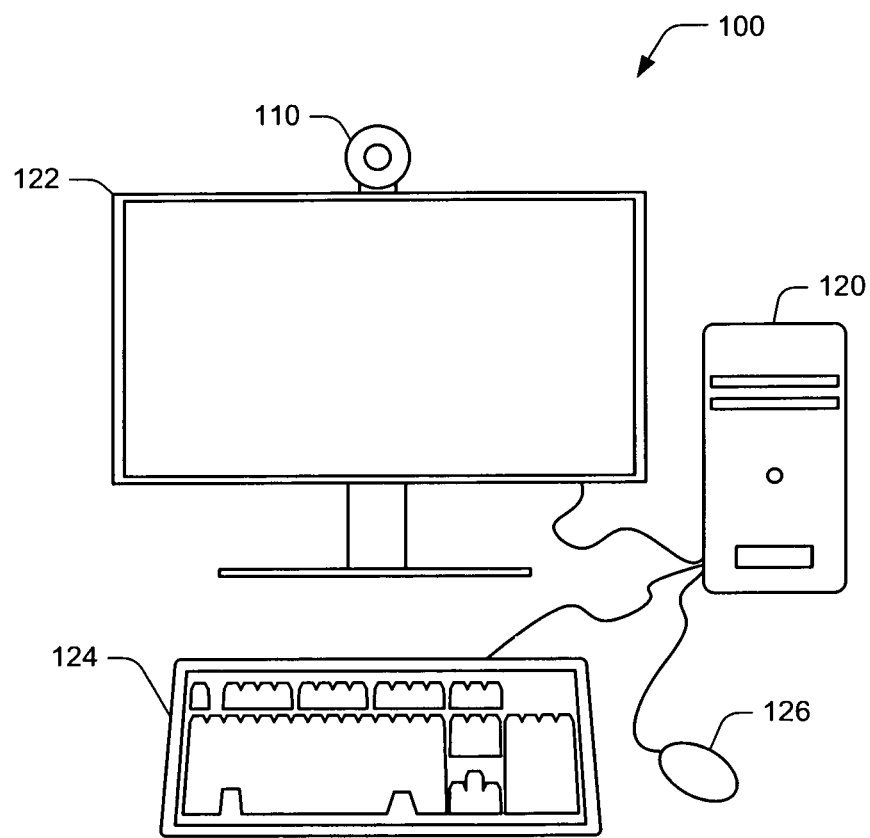
FIG. 1 depicts an exemplary system in accordance with some implementations disclosed herein.

In the following detailed description, reference is made to the accompanying drawings which form a part of the disclosure, and in which are shown by way of illustration, and not of limitation, exemplary implementations. Further, it should be noted that while the description provides various exemplary implementations, as described below and as illustrated in the drawings, this disclosure is not limited to the implementations described and illustrated herein, but can extend to other implementations, as would be known or as would become known to those skilled in the art. Reference in the specification to "one implementation", "this implementation", "these implementations" or "some implementations" means that a particular feature, structure, or characteristic described in connection with the implementations is included in at least one implementation, and the appearances of these phrases in various places in the specification are not necessarily all referring to the same implementation. Additionally, in the description, numerous specific details are set forth in order to provide a thorough disclosure. However, it will be apparent to one of ordinary skill in the art that these specific details may not all be needed in all implementations. In other circumstances, well-known structures, materials, circuits, processes and interfaces have not been described in detail, and/or may be illustrated in block diagram form, so as to not unnecessarily obscure the disclosure.

Implementations disclosed herein use invisible or otherwise non-intrusive lighting to enhance or augment one or more color images taken by a camera in a low-light environment. For example, some implementations disclosed herein use infrared (IR) light sources to augment an image. The IR light is invisible to the eyes of a user being imaged, but the IR light helps to raise the detected photons in its wavelength due to the IR light being reflected from objects being imaged and detected by an image sensor in the camera. Implementations herein emit the invisible IR light to the scene being imaged for raising the total light level of the scene. In implementations herein, the invisible infrared lighting does not disturb or distract the person being imaged in the scene. In some implementations, IR-LEDs (light emitting diodes) are used that emit IR light in the range of 800-900 nm (nanometers) because of the closeness to visible light and the ability of image sensors to detect the IR light at that wavelength more easily than at higher wavelengths. Thus, in some implementations, this wavelength of IR light results in good quantum efficiency for typical image sensors, such as conventional CMOS sensors, without requiring modifications to the CMOS sensors. In other implementations, ultraviolet light may be used as the invisible light for augmenting the lighting.

In some implementations, the camera image sensor captures light at the IR wavelengths, as well as in the other color bands of visible light, such as red (R), green (G), and blue (B), without blocking-out the IR band. Unlike traditional systems that only record either RGB or IR, in implementations disclosed herein, the system receives and converts the RGB bands and the IR band to an imaging signal at the same time. The recorded signal in the sensor becomes a mixture of light intensities of R, G, B and IR wavelengths which cannot be decoded in a traditional manner because significant color degradation occurs, i.e., the images become visually damaged due to the IR light. Accordingly, implementations herein use post-imaging processing to correct distortion in color and/or intensity to automatically produce a sharp and aesthetically pleasing image. Some implementations use a learning-based color correction technique, to produce visually plausible and enhanced images and videos from such a signal. Also, some implementations use a software-based technique for determining the light level of the scene being imaged, which is referred to as a "software light meter". Some implementations include a two-camera or two-image-sensor system that further enhances the image quality in low-light conditions.

FIG. 1 illustrates an exemplary system 100 for some implementations disclosed herein. System 100 includes a camera 110 and a first computer 120. First computer 120 includes a display 122 upon which camera 110 may be typically mounted. Computer 120 may further include user input devices such as a keyboard 124 and a mouse 126. As is known in the art, typically, a user sits in front of camera 110 and display 122 of computer 120. The user's image is received by camera 110 and transmitted by computer 120 to another computer (not shown in FIG. 1) via a network or the like, such as for providing a video image, video conferencing and communication, or the like. Further, while first computer 120 is illustrated as a desktop computer, first computer 120 may be any kind of processing device that is configured to process an image received from camera 110. In addition, while camera 110 is illustrated as a webcam in some implementations, other types of cameras, such video cameras and still image cameras are also included within the scope of implementations described herein, and the system 100 is only an example of one type of system in which the teachings herein may be implemented.

Figure 2:
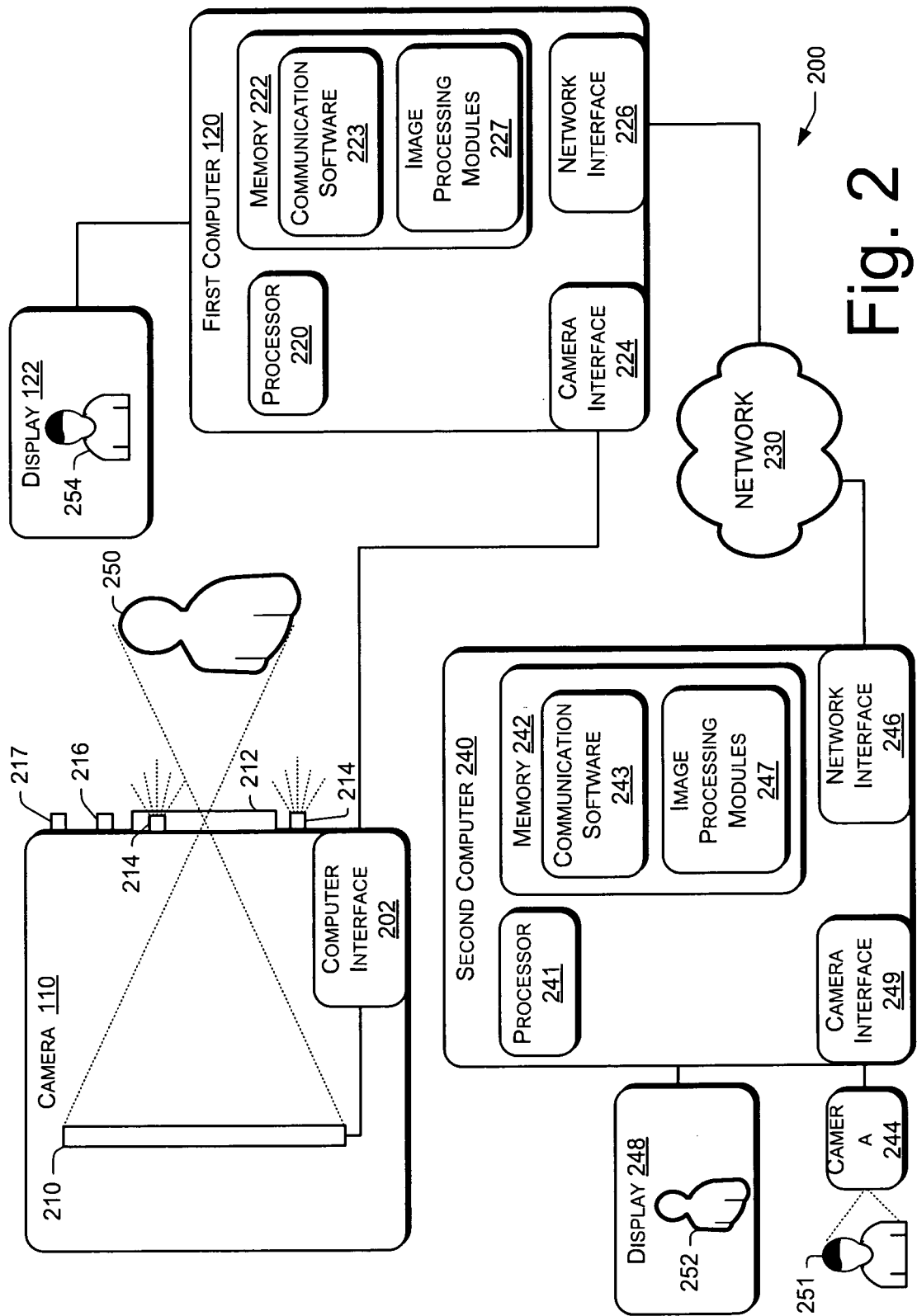
FIG. 2 depicts a logical and hardware configuration of a system in accordance with some implementations disclosed herein.

FIG. 2 illustrates an exemplary hardware and logical configuration of a system 200 according to some implementations. Camera 110 is connected to computer 120 by a computer interface 202. Computer interface 202 a may be a USB (universal serial bus) port, a FireWire™ (IEEE1394) port, or other suitable connection for transmitting image data from camera 110 to first computer 120. Camera 110 includes an image sensor 210 that receives an image through a lens 212. For example, image sensor 210 may be a color CMOS (complimentary metal-oxide semiconductor) type image sensor or other suitable type of image sensor able to convert light into electrons for producing a signal containing image data representative of a color image projected onto the image sensor 210.

First computer 120 includes a processor 220, a memory 222, a camera interface 224, and a network interface 226. Camera interface 224 may be a USB port, a FireWire™ port, or other suitable connection for receiving image data from camera 110 and for transmitting control signals to camera 110. Network interface 226 may be a network interface card or other suitable device for connecting to network 230. Network 230 may be a local area network (LAN), a wide-area network (WAN), such as the Internet, or other suitable communications link or network for connecting first computer 120 to a second computer 240.

Second computer 240 includes a processor 241, a memory 242, a camera 244, a network interface 246, a display 248, and a camera interface 249. In some implementations, during operation of camera 110, an image 252 of a user 250 of first computer 120 is received by camera 110 through lens 212 onto image sensor 210 and transferred to computer 120 through computer interface 202 and camera interface 224. Following image processing, discussed further below, the image 252 is transferred from first computer 120 to second computer 240 over network 230 via network interfaces 226 and 246, respectively. A second user 251 at second computer 240 is able to view image 252 of the first user 250 on the second user's display 248. By transferring a number of sequential images over a short period of time, the second user 251 at second computer 240 experiences an almost real-time live video feed of the first user 250. For example, this live video feed may be transmitted in conjunction with voice data from the first user, as first user 250 communicates with second user 251. Similarly, second user 251 at second computer 240 may also have camera 244 which transmits images 254 of the second user 251 to display 122 of first computer 120, thereby enabling each of the users 250, 251 to see almost real-time video of the other user during communication.

A variety of communications software is readily available for facilitating the use of webcams for communication over networks. Such software includes Skype™, available from Skype Technologies S.A., Luxembourg, and a variety of other proprietary software products available from a variety of other companies. In some implementations, first computer 120 has communications software 223 stored in memory 222 and executed by processor 220, while second computer 240 has communications software 243 stored in memory 242 and executed by processor 241. Optionally, in some implementations, camera 244 may have the same capabilities as camera 110 and the image processing modules 247 contained in second computer 240 may be the same as image processing modules 227 contained in first computer 120, although this is not necessary for the proper function of first camera 110 and image processing modules 227. Memories 222, 242 may include volatile or nonvolatile random access memory, storage devices, such as disk drives, solid-state drives, removable storage media, computer-readable storage media, processor-accessible storage media, or the like. Furthermore, computers 120, 240 may also include a number of additional components and software modules, as is known in the art, such as operating systems, other communication modules, display adapters, user interfaces, peripherals, and the like, that are not illustrated for clarity of explanation.

As an example for discussion, when a conventional color webcam is used in place of camera 110 by user 250 at first computer 120 in inadequate lighting situations, such as due to low light, back lighting, etc., resulting in a low-light environment, the image 252 received and displayed on display 248 at second computer 240 will typically be of low quality, such as including poor color quality, excessive noise, fuzziness, or the like. Typically, it is not desirable or practical to provide additional lighting in conjunction with a webcam in such a situation, as this may result in the light constantly shining into the eyes of the user while the user is trying to view the computer display, which can be intrusive and distracting to the user.

Figure 3:
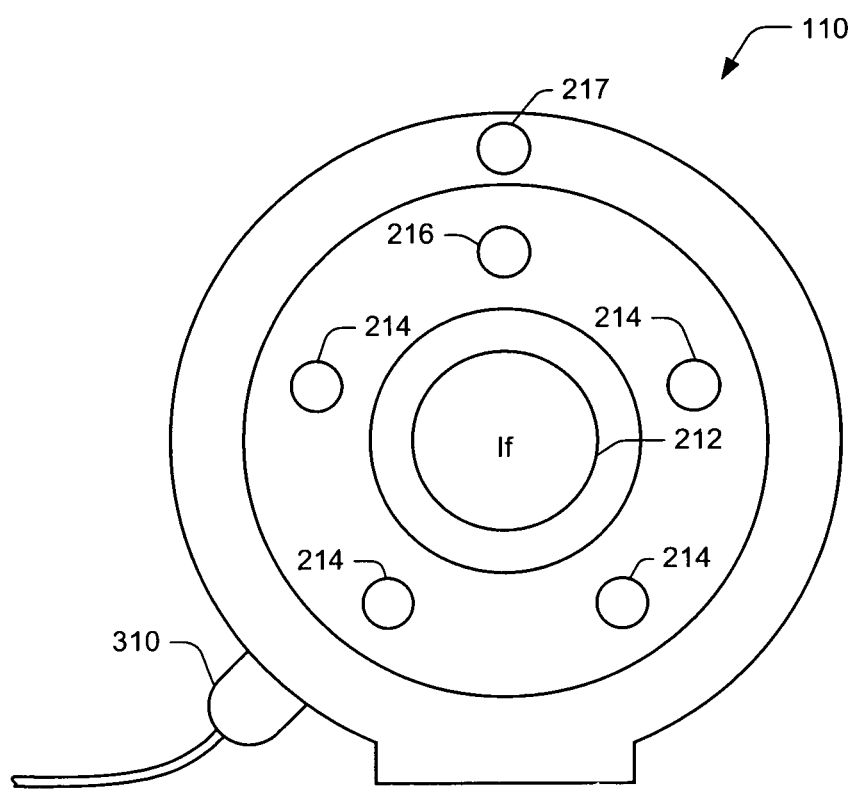
FIG. 3 depicts an exemplary imaging device in accordance with some implementations disclosed herein.

Accordingly, as also illustrated in FIG. 3, some implementations herein provide camera 110 with one or more non-intrusive light emitters 214 which direct invisible or non-intrusive light toward the subject being image. Invisible light is light at a wavelength outside the normal range of human vision. Non-intrusive lighting may or may not be invisible, but is able to increase the lighting on a subject without being significantly noticeable or distracting to the subject. In some implementations light emitters 214 emit invisible infrared (IR) light at user 250 while camera 110 is in operation. The IR light emitted by emitters 214 improves illumination on user 250, thereby increasing the amount of light received by image sensor 210 of camera 110. In some implementations, light emitters 214 emit infrared light at a wavelength between 800 nm and 900 nm. For example, in some implementations, light emitters 214 are 850 nm IR LEDs (light emitting diodes), although in other implementations, other wavelengths of IR light emitters, and other types of IR light emitters may be used. The inventors herein have discovered that the use of IR light emitters in the wavelengths between 800 and 900 nm is advantageous, because a conventional color CMOS sensor is able to receive and detect IR light in this wavelength, while the IR light is invisible to the human eye. For instance, light that is visible to the human eye is typically about 380 to 750 nm in wavelength. Accordingly, by using IR light emitters that emit IR light between 800 and 900 nm in wavelength, the IR light emitted is not visible to the human eye, but can still be detected by a conventional color CMOS imaging sensor. Further, while light emitters 214 are illustrated as being mounted on camera 110, in other implementations, the one or more light emitters 214 may be located elsewhere, so long as light emitters 214 are able to emit the invisible or non-intrusive light toward the subject/scene being imaged for reflection back toward camera 110 for capture by image sensor 210.

Typically, a color CMOS sensor is outfitted with an infrared-(IR-) blocking filter, which would block the additional IR light provided by light emitters 214 in these implementations. Accordingly, in some implementations, image sensor 210 is a color CMOS image sensor without an IR-blocking filter. In other implementations, image sensor 210 includes an IR-blocking filter (not shown) that only blocks IR light at wavelengths greater than 900 nm.

Further, in some implementations, the brightness of light emitters 214 and the camera parameters are both controlled from computer 120. For example, camera 110 or computer 120 may include a light level sensor 217 for sensing a light level in the environment. When the light level in the environment falls below a predetermined threshold, the camera or the computer may determine that a low-light environment exists, and cause light emitters 214 to automatically turn on and begin emitting IR light. This may simultaneously trigger processing of the images received from camera 110 by image processing modules 227, as discussed further below. The brightness of non-intrusive light emitters 214 is controlled, so that the lower the detected ambient light level, the greater the amount of IR light emitted by light emitters 214. Other camera parameters may also be automatically controlled by computer 120, such as lens aperture, zoom level, exposure time, and the like.

Some implementations discussed above are directed to the use of IR light to improve the lighting on a subject without directing additional visible light at the subject. In other implementations, other non-visible light sources, such as for providing ultraviolet (UV) light instead of IR light, may be used for non-intrusive light emitters 214. In some implementations, UV light emitting LEDs are used as non-intrusive light emitters 214 for emitting additional invisible lighting toward a subject being imaged. The UV light emitting LEDs may be provided on camera 110 as non-intrusive light emitters 214 or may be otherwise directed toward a subject being imaged. The UV light emitting LEDs may emit UV light in a range between 280-350 nm, so as to be invisible to the normal range of vision. Further, it should be noted that the implementations using UV light sources might be desirable in a non-human environment to avoid the harmful effects of directing UW light at a person.

In yet other implementations, a pleasant, non-distracting, but visible light is used which also addresses the same low light situation and also requires color/intensity correction. One implementation of the visible light source includes providing one or more visible-light LEDs as non-intrusive light emitters 214, and further providing a diffusive element such as a Fresnel lens structure (not shown) between the visible light source and the subject (e.g., the user of the computer) so that the additional lighting is non-intrusive, thereby preventing the light from disturbing or distracting the user. In other implementations, diffusive technologies similar to LCD backlighting or household lighting situations can be deployed. Additionally, because the color spectrum and light intensity is still often limited in the visible light implementations described above, similar post imaging processing approaches, as applicable to the invisible light implementations, i.e., color correction and intensity improvement, may still be applied.

Color Correction using Learned Color Values

In some implementations herein, invisible or non-intrusive light emitters 214 emit infrared light toward the subject (i.e., scene) being photographed. Camera 110 records a color image of the scene that is augmented by the added IR light intensity. Because of the added IR light, the recorded raw image appears to be unnatural due to the IR irradiance. For example, IR lighting used with conventional camera systems is typically is only able to produce a monochrome or black-and-white image. Similarly, UV lighting also only produces monochrome or black-and-white images. Implementations herein provide for a color correction method that is able to process the image received from camera 110 to account for the alteration in the image due to the use of the IR or UW radiation, or to improve a poor quality color image taken using the diffusive lighting techniques described above. In some implementations, color statistics are learned from a training set of facial images which look visually appealing. Then, these color statistics are used to automatically adjust the color of an input image received from camera 110 so that the color statistics in the facial region of the input image matches those in the training set. This technique may sometimes be referred to hereafter as the "studio color" technique. Co-pending U.S. patent application Ser. No. 11/801,620, to Zicheng Liu et al., filed May 10, 2007, assigned to the same assignee as herein, the entire disclosure of which was incorporated herein by reference above, describes use of this technique with conventional cameras. The use of this technique relative to the present invention is described further with reference to FIG. 6C below.

Alternatively, in some implementations the color adjustment can be performed by a chromaticity correction method. Chromaticity is a normalized color value computed as $$[C_R, C_G, C_B] = \left[\frac{R}{R+G+B}, \frac{G}{R+G+B}, \frac{B}{R+G+B}\right].$$

Under this implementation, chromaticity statistics are learned from one or more reference images, either using studio quality images, or using one or more reference images obtained in the manner discussed below. The chromaticity statistics are learned from the one or more reference images to obtain $[C_R^{ref}, C_G^{ref}, C_B^{ref}]$, which represents the weighted mean chromaticity of the reference dataset (training dataset). By computing the weighted mean chromaticity of the input image (i.e., the image being processed to correct the distortion caused by the IR or UW light), a similar quantity $[C_R^{in}, C_G^{in}, C_B^{in}]$ can be obtained. Using these weighted chromaticities, the color of the input image [R, G, B] in can be corrected to produce an output color $[R, G, B]_{out}$ by $$\begin{bmatrix} R \\ G \\ B \end{bmatrix}_{out} = \begin{bmatrix} \frac{C_R^{ref}}{C_R^{in}} & 0 & 0 \\ 0 & \frac{C_G^{ref}}{C_G^{in}} & 0 \\ 0 & 0 & \frac{C_B^{ref}}{C_B^{in}} \end{bmatrix} \begin{bmatrix} R \\ G \\ B \end{bmatrix}_{in}.$$

The color correction may be carried out on a pixel-by-pixel basis. For example, for each pixel, an [RGB] value is obtained (represented as $[RGB]_{in}$), and the output [RGB] value ($[RGB]_{out}$) is computed by the matrix operation shown above. Furthermore, this color correction technique can be applied in a different color space, not limited to RGB color space. For example a similar technique may be applied using a CMYK (cyan, magenta, yellow and black) color space or other color space models. FIG. 6C also represents an exemplary process for carrying out this implementation for color correcting of an image.

In the above-referenced US Patent Application to Liu et al., the training and color correction are based on "studio quality" photos. In other implementations disclosed herein, a white light flash LED 216 is provided in conjunction with camera 110 in addition to invisible or non-intrusive light emitters 214. The white light flash LED 216 is used once at the beginning of a video photography session, such as when the user starts using a webcam to obtain a baseline full color image (i.e., a reference image) so the color correction can be accurately applied to the images taken subsequently by camera 110 using IR, UV or diffusive light in a low-light environment. In these implementations, when the user activates camera 110, such as by starting up communications software 223, as camera 110 becomes active, white light flash LED 216 flashes once and a corresponding image is captured by image sensor 210. Because this image obtained with the white light flash LED 216 is well lit, the color information is superior to that obtainable in low-light situations. Accordingly, the color information that is captured is then used during the remainder of the session for color correction of the images taken in a poorly-lit environment. Thus, for example, in some implementations the images output are augmented by the use of the IR light so as to be brighter and sharper, while the color correction corrects color distortion caused by the IR light, thereby rendering an image of much higher quality than would otherwise be able to be produced in the low-light environment.

In an alternative implementation, RGB LEDs (not shown) may be flashed separately to achieve the same result as the white light LED 216. For example, one each of a red LED, a green LED, and a blue LED may be mounted on camera 110, and these may each be flashed sequentially to obtain baseline red, green and blue images respectively, and these may be used for post-imaging processing of images subsequently taken in a low-light environment using the non-intrusive light emitters 214.

In another alternative implementation for obtaining "reference" photos for the image processing modules 227, the user can designate one or more photos of himself or herself so the image processing modules 227 adopt the user's skin color for color correction. This is especially applicable for webcam instant messaging (IM) sessions when the user typically is required to sign in. Thus, when the user logs in to an IM session, computer 120 can automatically associate a photo chosen by the user for use as a reference photo to be used by the image processing modules 227 for color correction during the webcam IM session.

Gamma Color Correction with Software Light Meter

Having a proper light level is important for obtaining high-quality images with digital image sensing devices. Implementations described herein are directed to correcting the light level of a captured video frame (or a single image) to improve the visual quality of videos and images. Light metering is a process of measuring the amount of light that a camera is receiving. The technology is often used to determine a proper exposure for a photograph, so that the resulting photography looks good in terms of the light level. In conventional cameras, light metering devices are often built in to the camera, and scene brightness is measured via the camera lens before taking a photograph.

Some implementations disclosed herein achieve a similar goal, i.e., measuring the light level of an image and using the measured light level to improve image quality, but this is carried out as a post-imaging process. Thus, in implementations herein, after the images have already been captured and transmitted to the computer, the light level of each image is measured and the measured light level can then be used for image enhancement such as for Gamma correction for correcting the intensity of the image (i.e., brightness).

In some implementations, the software light meter evaluates an intensity distribution in a recorded image. For example, this technology measures a weighted light intensity distribution using a 2-D Gaussian mask centered at the middle of the image. However, the weight distribution is not limited to the use of the Gaussian function, and other suitable functions may also be used in some implementations.

Figure 4:
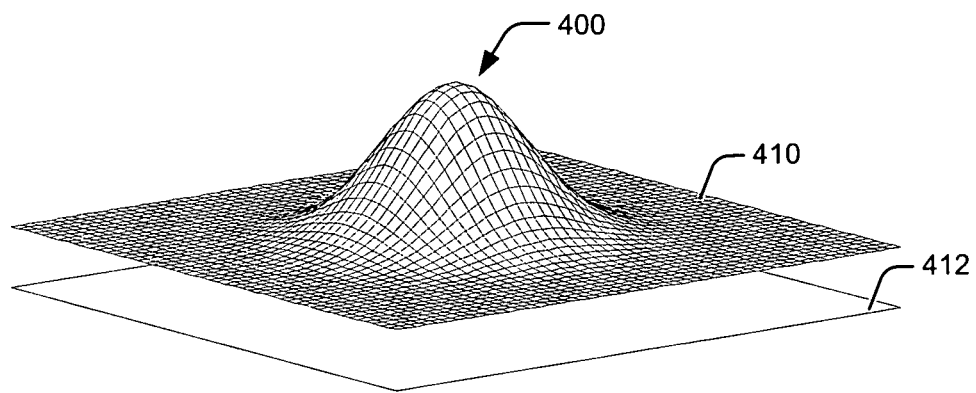
FIG. 4 depicts a Gaussian mask for use with some implementations.

FIG. 4 illustrates a conceptual example 400 of using a 2-D Gaussian mask 410 for software light metering of an image 420. Using the Gaussian mask 410, the light level is evaluated by the weighted mean intensity $\bar{I}$ as $$\bar{I} = \frac{\sum_{x,y} w(x, y) I(x, y)}{\sum_{x,y} w(x, y)}$$

where w is a weight factor determined by the Gaussian mask, I is an intensity value, and (x, y) represents the pixel location in a frame. This process is performed for each RGB color-channel independently. The measured light level is then used for image enhancement. For instance, the measured light level may be used in an "auto-Gamma correction" method using the light level determined using the software light meter implementation described above.

Gamma correction is a method for non-linearly transforming image intensities. The Gamma correction function is written as:

$$O = I^\gamma$$

where O and I are an input intensity and output intensity, respectively, and γ (Gamma) is the parameter of the function that determines the intensity transformation. Assuming that the best mean intensity in a corrected image is $\bar{O}$ (=128, for example), then the optimal value $\bar{\gamma}$ (the optimal Gamma value) can be determined using the weighted mean intensity $\bar{I}$ by $$\bar{\gamma} = \frac{\log \bar{O}}{\log \bar{I}}$$

Figure 5:
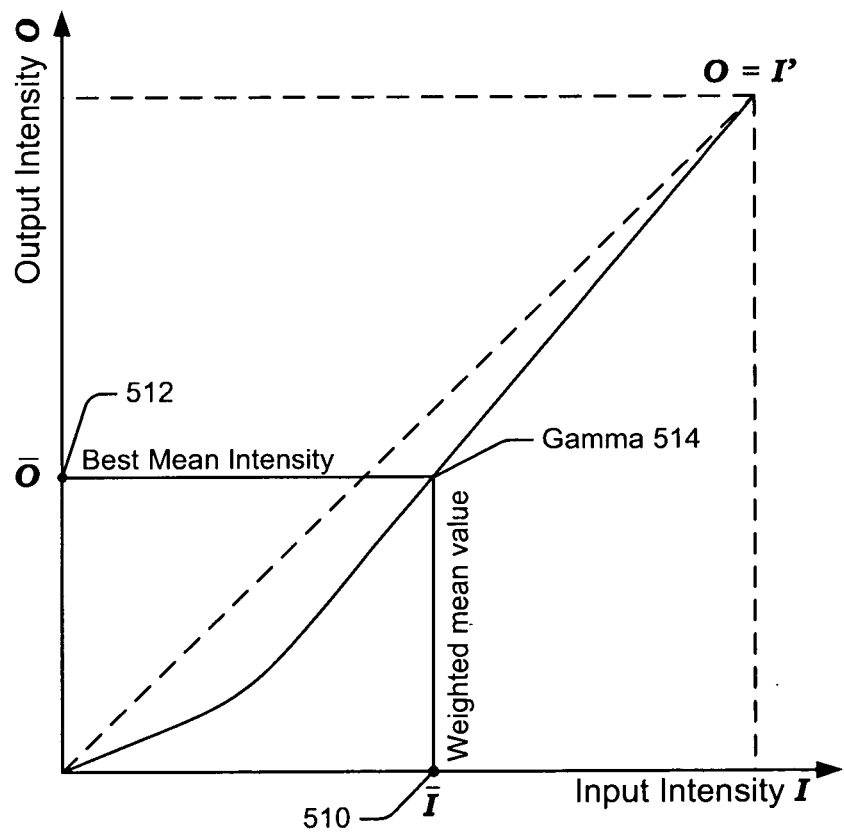
FIG. 5 depicts an example of a determination of a gamma value from a weighted mean light level.

FIG. 5 illustrates a graph 500 showing determination of the optimal Gamma value $\bar{\gamma}$ 514 from the weighted mean light level $\bar{I}$ 510 and the best mean intensity $\bar{O}$ 512. In FIG. 5, the Gamma value is determined based on the above formula, and the optimal Gamma value 514 occurs at the coincidence of the best mean output intensity 512 and the weighted mean input value 510.

Once the optimal Gamma value $\bar{\gamma}$ is determined, the input image intensity I is corrected by applying the Gamma correction function as $$O = I^{\bar{\gamma}}$$

The actual computation is performed by pre-computing the exponentiation $I^{\bar{\gamma}}$ for all intensity values in the range (e.g., [0, 255]) and storing in a lookup table. Given an input image, for each pixel, the intensity value is converted using the lookup table. The resulting corrected image appears sharper, brighter and with improved coloration over what would otherwise be the case for an image taken in a low-light environment without the non-intrusive lighting.

Exemplary Processes

Figure 6A:
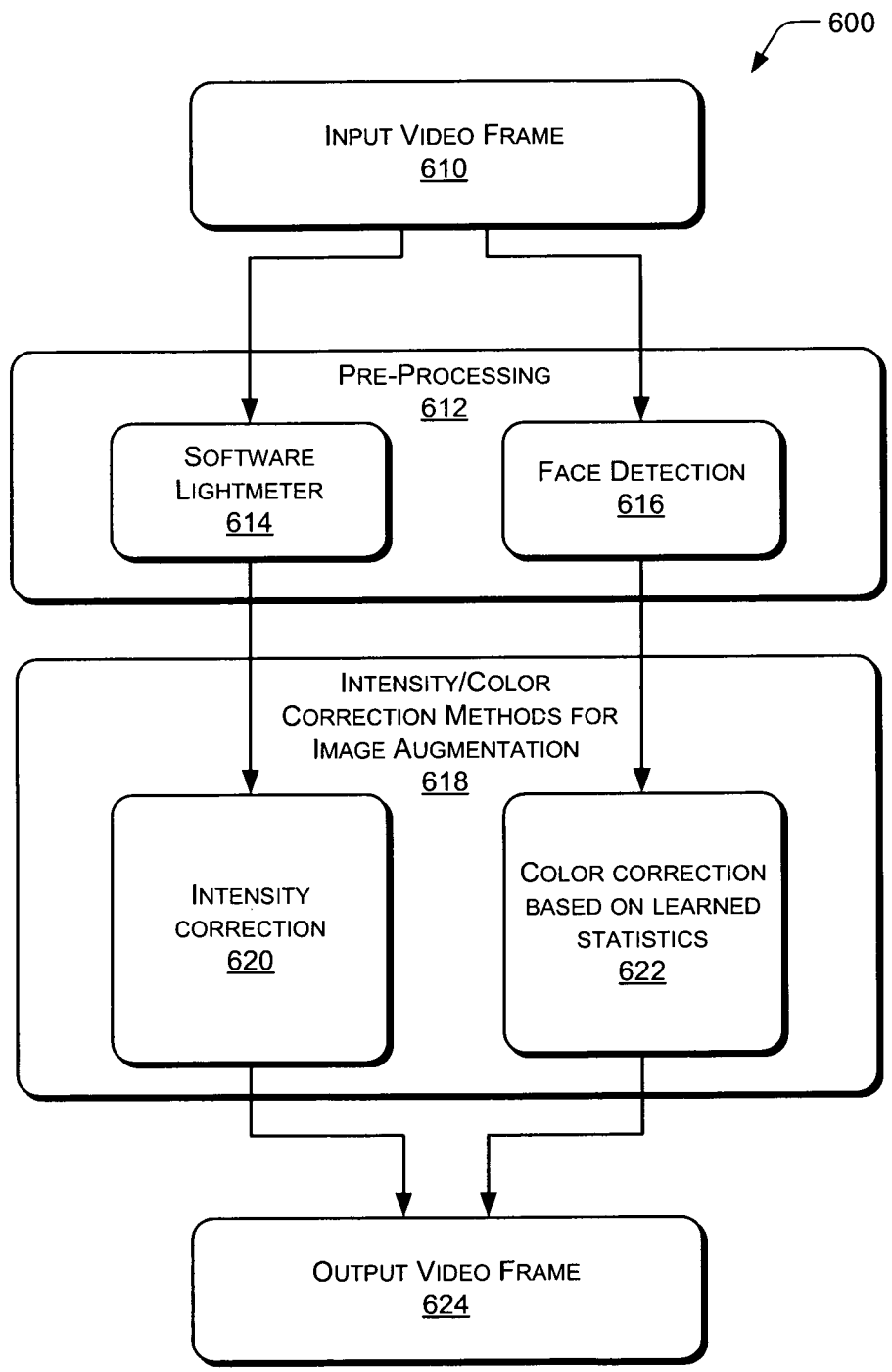
FIGS. 6A-6C depict exemplary flowcharts of processes in accordance with some implementations.

FIG. 6A illustrates an exemplary flowchart 600 of an overview of a process according to some implementations, and further illustrates how the gamma correction and software light metering method corresponds to the color correction method based on learned color values. In implementations herein, either or both of these methods can be used for intensity level correction and/or color correction for counteracting the effects of the IR or UW light exposure on the color quality of an image, or for improving an image taken using diffusive lighting.

At block 610, an image captured by the image sensor is received as a new input image for processing. As discussed above, the image may be a single image, or may be one of a series of video images, taken in a low-light environment using the non-intrusive lighting techniques discussed above. The image may undergo image augmentation and correction using one or more of the intensity and color correction techniques discussed above.

At block 612, preprocessing of the image is carried out. The preprocessing carried out depends on the image augmentation method that will be used.

At block 614, when image augmentation will be accomplished using gamma correction, the preprocessing may be carried out according to the software light meter process discussed above by determining an optimal gamma value for carrying out the gamma correction of the image.

At block 616, when the image augmentation will be accomplished on an image of a person based on one or more stored good-color images, facial detection is carried out for detecting a face present in the image. A facial recognition module may be used for this process, as is known in the art.

At block 618, the color and/or intensity correction is carried out to augment the image taken in the low-light environment.

At block 620, when the gamma correction is being used as the image augmentation technique, intensity correction is carried out as described above.

At block 622, when the color correction is being accomplished based on one or more stored good-color reference images, the face recognized at block 616 is corrected based on the color of the stored good-color reference image(s).

At block 624, the augmented image is output, and the process if repeated for the next image.

Figure 6B:
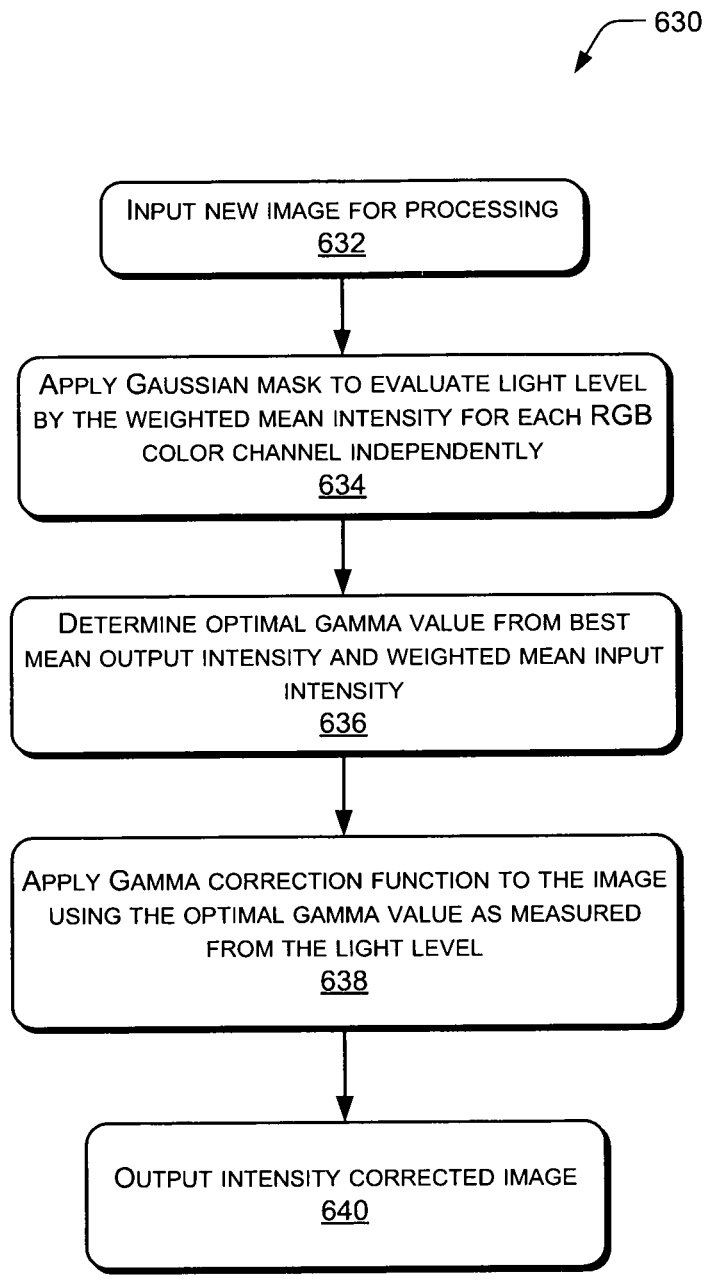
Figure 6C:
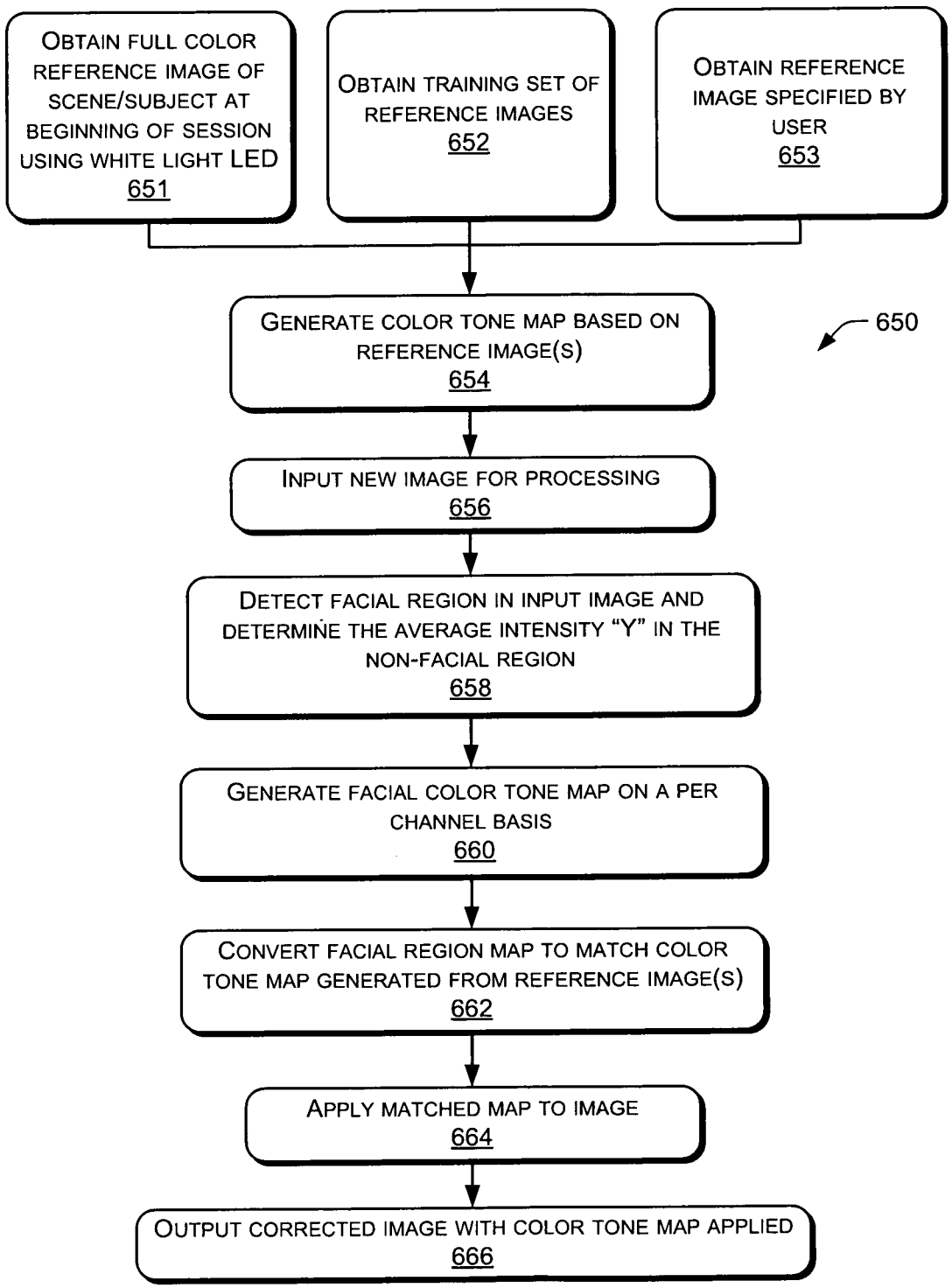

FIG. 6B presents an exemplary flowchart 630 illustrating the details of blocks 614 and 620 from FIG. 6A.

At block 632, the new input image is received for processing.

At block 634, a Gaussian mask is applied to the image to evaluate light levels by using the weighted mean intensity for each RGB color channel independently.

At block 636, the optimal gamma value is determined from the best mean output intensity and the weighted mean input intensity.

At block 638, the gamma correction function is applied to the image using the optimal gamma value as measured from the light level determined at block 634.

At block 640, the color and intensity of the image is corrected and the corrected and augmented image is output with the effects of the IR radiation or UW radiation having been eliminated, or in the case of diffusive lighting, with the image augmented to improve the appearance.

FIG. 6C depicts an exemplary flowchart 650 for illustrating the details of blocks 616 and 622 from FIG. 6A. As discussed above, FIG. 6C represents image augmentation using color correction techniques discussed above with reference to the studio color techniques and the chromaticity techniques.

At block 651, a full color image of the scene or subject is obtained for use as a reference image at the beginning of a session. For example, this may be performed at the beginning of the session using the white light LED 216, as described above, such as when the user activates the camera, logs in to the computer or an IM service, or the like.

At block 652, in alternative implementations, studio quality images obtained previously may be used as a training set of one or more reference images, as discussed in the patent application to Liu et al., incorporated by reference above. For example, the training images may be professionally obtained images selected based on perceived image quality having a color tone that is viewed as pleasing to a majority of people. Thus, the reference images used in the training set do not necessarily have to be images of the user, but may be ideal images of models, celebrities, or the like, taken in desirable or ideal lighting environments, such as professionally shot images taken in studio conditions.

At block 653, as another alternative implementation, the user may assign a preferred photograph of himself or herself to be used as a reference image.

At block 654, a color tone map is generated based on the one or more full color reference images obtained at any of blocks 651, 652 or 653.

At block 656, the new input image is received for processing.

At block 658, the facial region of the input image is detected, and the average intensity is determined for the non-facial region of the input image.

At block 660, a facial color tone map is generated on a per channel basis from the input image.

At block 662, the facial region map of the input image is converted to match the color tone map generated from the full-color image.

At block 664, the matched map is applied to the input image, for example, by adjusting the color of the image on a pixel-by-pixel basis according to the matched color tone map.

At block 666, the image is output with the color tone map having been applied to produce a color corrected augmented image from which the effects of the IR or UV radiation have been eliminated, or, in the case of diffusive lighting, with the poor quality image being augmented.

Additionally, in some implementations, recognizing the facial region is not necessary. For example, if the white light flash technique is used, then the reference image will be similar in proportions to the image being processed without having to recognize a facial region, and the color tone mapping may be carried out of the entire image without mapping a particular facial region.

Dual Sensor Implementation

Figure 7:
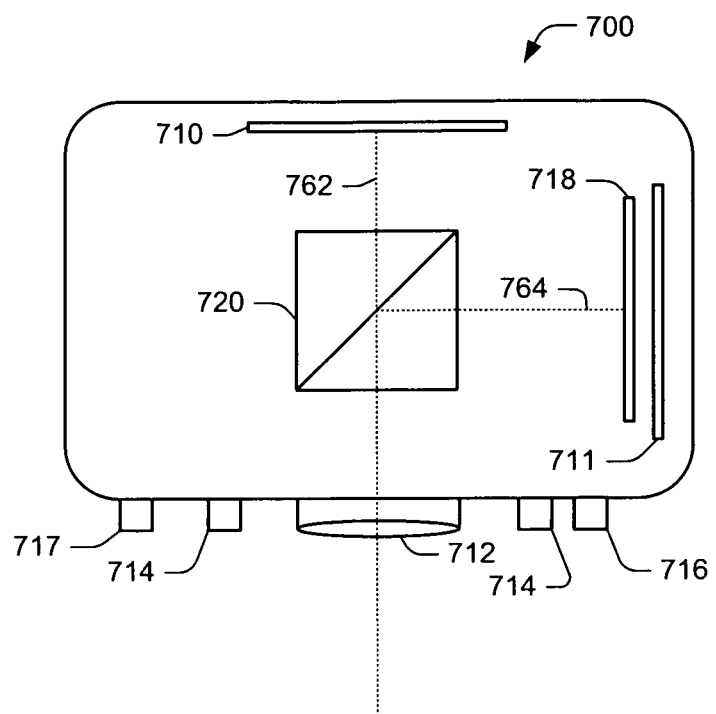
FIG. 7 depicts an implementation having multiple image sensors.

FIG. 7 illustrates an alternative implementation of a camera 700 according to some implementations. Camera 700 includes a first image sensor 710, as described above, without an IR-blocking filter. Furthermore, camera 700 includes a second image sensor 711 having an IR-blocking filter 718 that is able to block out IR light, including infrared in the range of 800 nm and above. As with camera 110 described above, in these implementations, light emitters 714 may be IR light emitters included with camera 700 for providing additional invisible lighting in low-light environments. A subject or scene to be imaged is received through lens 712 and reflected by a mirror 720 onto both first image sensor 710 and second image sensor 711. In a low-lighting environment, the images captured by the second image sensor 711 are noisy, while the images captured by the first image sensor camera have better signal to noise ratio, but the color is washed out due to the infrared component.

In place of or in addition to the image processing techniques describe above with respect to FIGS. 6A-6C, in these implementations, during post imaging processing, the image received at the first image sensor 710 is combined with the image received at the second image sensor to produce a single combined image which has better color than the infrared-enhanced image (from image sensor 710) and that is less noisy than the visible light image (from image sensor 711). In these implementations, image processing software 227 may carry out a technique for combining the two images by replacing the Y' channel of the images captured by second image sensor 711 with the Y' channel of the image captured by first image sensor 710. For example, in a Y'UV color space, signals are typically created from an original RGB (red, green and blue) source. The weighted values of R, G, and B are added together to produce a single Y' channel signal, representing the overall brightness, or luminance, of that spot. Thus, the brightness of the image captured by the second image sensor (without infrared and without color distortion) is adjusted based on the brightness levels obtained from the first image sensor (with infrared and color distortion). Further while this implementation is described using a Y'UV color space, other color spaces, such as XYZ, may also be used for combining the two images.

In order for the two images to be combined satisfactorily, the pixel alignment for the two images should be established before the two images are combined. One way of solving the pixel alignment problem is through the use of mirror 720, such as a beam splitter, or other suitable structure, which splits the light rays so that one set of the light rays 762 go to the first image sensor 710, while an identical set of light rays 764 goes to second image sensor 711. In addition, following the combining of the two images, one or more of the color correction techniques discussed above with respect to FIGS. 6B-6C may also be applied. Thus, camera 700 may also include a white light flash LED 716, or red, green and blue LEDs (not shown), as discussed above. However, in other implementations, no additional image processing is necessary for achieving quality images. Camera 700 may also include a light level sensor 717, as discussed above for use in determining when a low-light environment exists.

Furthermore, in an alternative implementation, two separate cameras may be used in place of camera 700, with a first camera including an IR-blocking filter 718, and the second camera not having an IR-blocking filter. In this implementation, the task of aligning the pixels becomes more complex because of the slightly different image received by the separate cameras, but common features of the subject/scene being imaged can be recognized by the image processing software 227, an used for approximating pixel alignment.

Additionally, in implementations in which UV light emitters are used as light emitters 714, IR-blocking filter 718 may instead be a UV-blocking filter, and the two images taken by image sensors 710, 711 may be combined in a manner similar to that described above for the IR light implementations.

Processing at Camera

Figure 8:
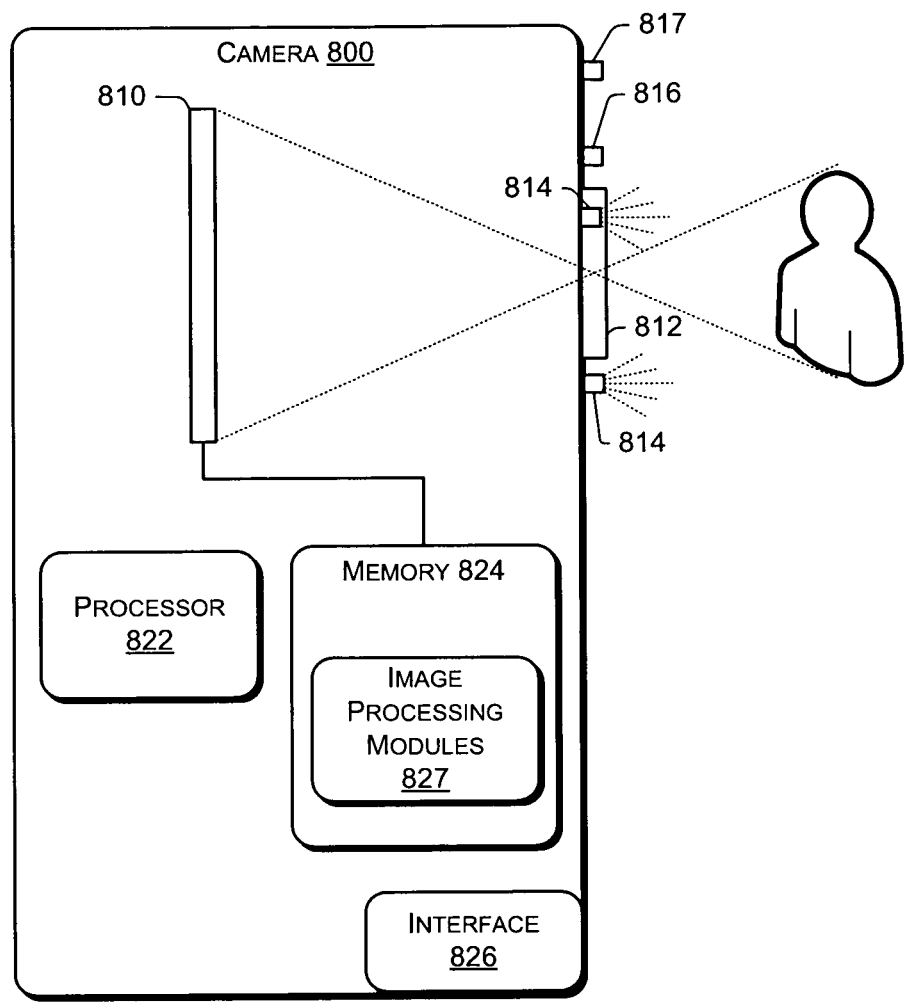
FIG. 8 depicts an alternative implementation having processing in the camera.

FIG. 8 illustrates an alternative implementation in which the image processing is carried out at the camera, rather than by a computer. In FIG. 8, a camera 810 includes an image sensor 810, a lens 812, and one or more non-intrusive light emitters 814. Camera 8 10 may also optionally include a white light flash LED 816 and light level sensor 817. Camera 810 may further include a processor 822, a memory 824, and an interface 826. Memory 824 includes image-processing modules 827 for carrying out the image processing described above with respect to the early implementations. Thus, camera 810 is able to output a fully processed image that has already had color correction performed. Interface 826 may be used to transmit the image to a computer, such as via a USB or FireWire connection, or, alternatively, interface 826 may be a network connection for transmitting the image over a network, or the like. Furthermore, while several examples of possible camera configurations have been illustrated and described herein, the disclosure is not limited to the described implementations, as many other possible implementations will be apparent to those of skill in the art in light of the disclosure herein. Memory 824 may include volatile or non-volatile random access memory, storage devices, such as disk drives, solid-state drives, removable storage media, other processor-accessible storage media, or the like. Furthermore, camera 810 may also include a number of additional components and software modules, as is known in the art, such as an operating system, user interface, and the like, that are not illustrated for clarity of explanation.

Conclusion

From the foregoing, it should be apparent that implementations herein provide images of improved quality in low light environments. Implementations include invisible or otherwise non-intrusive light sources for improving the lighting on a subject being imaged. Some implementations use IR, UV or diffusive light sources in conjunction with a camera to augment an image by raising the total light level of the scene. In implementations herein, the invisible IR lighting does not disturb or distract the person being imaged in the scene. Further, post-processing techniques are taught for improving the color quality of the images to counteract the effects of the IR or UV light. Accordingly, implementations herein provide for one or more images that are augmented by the use of the IR or UW light so as to be brighter and sharper, while the color correction techniques applied herein correct color distortion caused by the IR or UW light, thereby resulting in an image of much higher quality than would otherwise be able to be produced in a low-light environment.

Implementations also relate to a system and apparatus for performing the operations described herein. This system and apparatus may be specially constructed for the required purposes, or may include one or more computers selectively activated or reconfigured by one or more programs when the program instructions are executed. Such programs may be stored in one or more processor-readable storage mediums having processor-readable program code embodied therein. The processor-readable program code is implemented at least in part by one or more processors to perform functions of the implementations described herein. The one or more processor-readable storage mediums may include, but are not limited to, optical disks, magnetic disks, read-only memories, random access memories, solid-state devices and drives, or any other type of medium suitable for storing electronic information, and may be stored at a location remote from the one or more processors executing the one or more programs.

Some implementations are described in the context of computer-executable instructions, such as program modules, and executed by one or more computers or other processing devices. Generally, program modules include routines, programs, objects, components, data structures, and the like, that perform particular tasks or implement particular functions. Typically the functionality of the program modules may be combined or distributed as desired in various implementations. In addition, implementations are not necessarily described with reference to any particular programming language. It will be appreciated that a variety of programming languages may be used to implement the teachings described herein. Further, it should be noted that the system and apparatus configurations illustrated in FIGS. 1, 2, 3, 7 and 8 are purely exemplary of system and apparatuses in which the implementations may be provided, and the implementations are not limited to the particular hardware configurations illustrated. In the description, numerous details are set forth for purposes of explanation in order to provide a thorough understanding of the disclosure. However, it will be apparent to one skilled in the art that not all of these specific details are required.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims. Additionally, those of ordinary skill in the art appreciate that any arrangement that is calculated to achieve the same purpose may be substituted for the specific implementations disclosed. This disclosure is intended to cover any and all adaptations or variations of the disclosed implementations, and it is to be understood that the terms used in the following claims should not be construed to limit this patent to the specific implementations disclosed in the specification. Rather, the scope of this patent is to be determined entirely by the following claims, along with the full range of equivalents to which such claims are entitled.

The invention claimed is:

1. A method comprising:
emitting invisible light in a non-visible wavelength toward a subject being imaged in a low-light environment;
capturing a first image of the subject using a camera having a first color image sensor, the first image being a color image;
processing the first image to correct distortion in the first image caused by the invisible light to produce an augmented color first image; and
outputting the augmented color first image.

2. The method according to claim 1, wherein the processing the first image further comprises:
applying a Gaussian mask to evaluate a light level of the first image;
determining an optimal gamma correction value from a best mean output intensity and a weighted mean input intensity; and
correcting an intensity of the first image by using the determined optimal gamma value.

3. The method according to claim 1, wherein the processing the first image further comprises:
detecting a facial region of the first image;
generating a first color tone map based on the facial region of the first image and a set of training images; and
correcting the color of the first image by applying the first color tone map to the first image.

4. The method according to claim 1, wherein the processing the first image further comprises:
providing a white light source on the camera;
obtaining a full color reference image by flashing the white light source to illuminate the subject prior to emitting the invisible light;
detecting a facial region of the first image;
generating a first color tone map based on the facial region of the first image and the full color reference image; and
correcting the color of the first image by applying the first color tone map to the first image.

5. The method according to claim 1, further comprising:
emitting the invisible light as infrared light in a wavelength between 800 and 900 nm, or as ultraviolet light in a wavelength between 280-350 nm.

6. The method according to claim 1, wherein the camera is a webcam, and further comprising:
receiving the first image at a first computer in communication with the webcam prior to the processing of the first image to correct color distortion;
carrying out the processing of the first image to correct color distortion at the first computer; and
transmitting the color-corrected image over a network from the first computer to a second computer for display at the second computer as part of a video image.

7. The method according to claim 1, wherein the invisible light is infrared light, and further comprising:
providing a second color image sensor in the camera;
providing an infrared filter with the second color image sensor for blocking the emitted infrared light;
splitting light received by the camera using a mirror, wherein the first image is projected onto the first image sensor, and a duplicate of the first image is projected onto the second image sensor; and
combining the first image and the duplicate of the first image to create the augmented color first image.

8. The method according to claim 1, further comprising:
receiving a full color reference image specified by the user;
detecting a facial region of the first image;
generating a first color tone map based on the facial region of the first image and the full color reference image; and
correcting the color of the first image by applying the first color tone map to the first image.

9. One or more computer readable storage devices storing processor-readable program code, said processor-readable program code implemented at least in part by one or more processors for processing the first image to correct the distortion in the first image caused by the invisible light according to the method of claim 1.

10. A system comprising:
a camera including a color image sensor;

an infrared light source for emitting infrared light toward a subject being imaged by the camera; and a processor coupled to a memory, wherein the memory contains an image-processing module for correcting image distortion caused by the infrared light for images captured by the camera, the images captured by the camera being color images.

11. The system according to claim 10, wherein the image-processing module is configured to correct the image distortion by:

applying a Gaussian mask to evaluate a light level of the first image;

determining an optimal gamma correction value from a best mean output intensity and a weighted mean input intensity; and correcting an intensity of the first image by using the determined optimal gamma value.

12. The system according to claim 10, wherein the image-processing module is configured to correct the image distortion by:

detecting a facial region of the first image;

generating a first color tone map based on the facial region of the first image and a set of training images; and correcting color distortion of the first image by applying the first color tone map to the first image.

13. The system according to claim 10, further comprising:
a white light LED mounted on the camera,
wherein a reference image is obtained by flashing the white light LED to illuminate the subject at least once prior to emitting of the infrared light,
wherein the image-processing module is configured to detecting a facial region of the first image, generate a first color tone map based on the facial region of the first image and the reference image, and correct color distortion of the first image by applying the first color tone map to the first image.

14. The system according to claim 10, further comprising:
one or more infrared LEDs mounted on the camera for emitting the infrared light in a wavelength between 800 and 900 nm.

15. The system according to claim 10, further comprising:
a first computer in communication with the camera,
wherein the processor and the memory are contained in the first computer for executing the image-processing module.

16. The system according to claim 10, further comprising:
a second color image sensor in the camera;
an infrared filter located with the second color image sensor for blocking the emitted infrared light;
a mirror in the camera for splitting light received by the camera, wherein the first image is projected onto the first image sensor, and a duplicate of the first image is projected onto the second image sensor; and
wherein the image processing module is configured to correct color distortion by combining the first image and the duplicate of the first image by replacing a Y' channel of the duplicate image with a Y' channel of the first image to create a combined image.

17. The system according to claim 10, further comprising:
providing the processor, the memory and the image processing module in the camera, wherein the processor in the camera processes the first image to correct color distortion prior to transmitting the first image outside the camera.

18. A method of obtaining color images in low-light environments, comprising:

providing a webcam for capturing images of a user of a computer, the webcam including a first image sensor and at least one infrared light emitter;

emitting infrared light toward the user being imaged in a low-light environment, wherein the infrared light is in wavelength between 800 and 900 nm;

capturing a plurality of video images of the user by the webcam in the low-light environment, said video images being color images and having color distortion due to the infrared light;

transmitting the captured video images sequentially from the webcam to the computer;

processing each video image to correct the color distortion in the video image caused by the infrared light; and transmitting the color-corrected video images sequentially to a second computer for display as part of a live video feed at the second computer.

19. The method according to claim 18, wherein the processing each video image to correct the color distortion in the video image further comprises:

providing a white light source on the camera;

obtaining a full color reference image by flashing the white light source to illuminate the subject prior to emitting the infrared light;

detecting a facial region of the first image;

generating a first color tone map based on the facial region of the first image and the full color reference image; and correcting the color of the first image by applying the first color tone map to the first image.

20. The method according to claim 18, further comprising:
providing a second color image sensor in the camera;
providing an infrared filter with the second color image sensor for blocking the emitted infrared light;
splitting light received by the camera using a mirror, wherein each captured image is projected onto the first image sensor, and a duplicate of each captured image is projected onto the second image sensor; and
correcting the color distortion by combining the each image and the duplicate of the each image by replacing a Y' channel of the duplicate image with a Y' channel of the image to create a combined image.

* * * * *